United States Patent
Lei et al.

(10) Patent No.: US 10,810,172 B2
(45) Date of Patent: Oct. 20, 2020

(54) DATA CLEARING METHOD, APPARATUS AND STORAGE MEDIUM

(71) Applicant: Beijing Xiaomi Mobile Software Co., Ltd., Haidian District, Beijing (CN)

(72) Inventors: Jian Lei, Beijing (CN); Jianquan Liu, Beijing (CN); Guoming Liu, Beijing (CN)

(73) Assignee: Beijing Xiaomi Mobile Software Co., Ltd., Beijing (CN)

( * ) Notice: Subject to any disclaimer, the term of this patent is extended or adjusted under 35 U.S.C. 154(b) by 514 days.

(21) Appl. No.: 15/654,074

(22) Filed: Jul. 19, 2017

(65) Prior Publication Data

US 2018/0046653 A1 Feb. 15, 2018

(30) Foreign Application Priority Data

Aug. 11, 2016 (CN) .......................... 2016 1 0659322

(51) Int. Cl.
*G06F 16/00* (2019.01)
*G06F 16/215* (2019.01)
(Continued)

(52) U.S. Cl.
CPC .......... *G06F 16/215* (2019.01); *G06F 16/162* (2019.01); *G06F 16/2272* (2019.01); *G06F 16/217* (2019.01)

(58) Field of Classification Search
CPC .. G06F 16/215; G06F 16/162; G06F 16/2272; G06F 16/16
See application file for complete search history.

(56) References Cited

U.S. PATENT DOCUMENTS 9,092,625 B1 * 7/2015 Kashyap ............... G06F 21/566
9,473,527 B1 * 10/2016 Zheng .................. G06F 21/564
(Continued)

FOREIGN PATENT DOCUMENTS

| CN | 102880714 A | 1/2013 |
|---|---|---|
| CN | 102929703 A | 2/2013 |

(Continued)

OTHER PUBLICATIONS

First Office Action (including English translation) issued in corresponding Chinese Application No. 201610659322.6 dated Jan. 9, 2019, 16 pages.
(Continued)

*Primary Examiner* — Leslie Wong
(74) *Attorney, Agent, or Firm* — Arch & Lake LLP

(57) ABSTRACT

The present disclosure relates to a data clearing method, apparatus, and storage medium. The method includes: determining whether a difference between a latest access time of data stored in a currently scanned node in a data structure, and a current time is greater than a predetermined threshold, where the data structure includes a plurality of nodes and each node store a latest access time and file information of respective data to be cleared; if the difference is greater than the predetermined threshold, determining whether the data to be cleared is in a white list; if the data to be cleared corresponding to the currently scanned node is in the white list, continuing to scan a next node; and if the data to be cleared corresponding to the currently scanned node is not in the white list, clearing the data to be cleared corresponding to the currently scanned node.

18 Claims, 4 Drawing Sheets

(51) Int. Cl.
  *G06F 16/22* (2019.01)
  *G06F 16/16* (2019.01)
  *G06F 16/21* (2019.01)

(56) References Cited

U.S. PATENT DOCUMENTS

| | | | | |
|---|---|---|---|---|
| 10,437,791 | B1* | 10/2019 | Bebchuk | G06F 16/1873 |
| 2008/0224903 | A1* | 9/2008 | Samuels | H03M 7/3084 |
| | | | | 341/51 |
| 2008/0276234 | A1* | 11/2008 | Taylor | G06F 8/60 |
| | | | | 717/177 |
| 2009/0286509 | A1* | 11/2009 | Huber | H04M 15/73 |
| | | | | 455/410 |
| 2011/0066841 | A1* | 3/2011 | Goodrow | H04L 43/106 |
| | | | | 713/150 |
| 2012/0131012 | A1* | 5/2012 | Taylor | G06Q 10/00 |
| | | | | 707/748 |
| 2014/0068254 | A1* | 3/2014 | Scharf | G06F 21/6218 |
| | | | | 713/165 |
| 2014/0215621 | A1* | 7/2014 | Xaypanya | H04L 63/145 |
| | | | | 726/23 |
| 2014/0365451 | A1* | 12/2014 | Chen | G06F 16/162 |
| | | | | 707/692 |
| 2015/0087264 | A1* | 3/2015 | Goyal | G01S 19/34 |
| | | | | 455/411 |
| 2015/0088984 | A1* | 3/2015 | Liang | H04L 67/02 |
| | | | | 709/203 |
| 2015/0106556 | A1* | 4/2015 | Yu | G11C 16/349 |
| | | | | 711/103 |
| 2015/0134913 | A1* | 5/2015 | Huang | G06F 12/0833 |
| | | | | 711/135 |
| 2015/0242397 | A1* | 8/2015 | Zhuang | H04L 67/1097 |
| | | | | 707/827 |
| 2016/0063009 | A1* | 3/2016 | Charania | G06F 16/162 |
| | | | | 707/693 |
| 2016/0086391 | A1* | 3/2016 | Ricci | G07C 5/008 |
| | | | | 701/29.3 |
| 2017/0005962 | A1* | 1/2017 | Lewin-Eytan | H04L 51/12 |
| 2017/0339011 | A1* | 11/2017 | Condeixa | H04W 4/70 |
| 2018/0198765 | A1* | 7/2018 | Maybee | G06F 3/0623 |
| 2018/0300806 | A1* | 10/2018 | Wittkotter | G06Q 40/02 |
| 2019/0095385 | A1* | 3/2019 | Yu | G06F 16/162 |

FOREIGN PATENT DOCUMENTS

| | | |
|---|---|---|
| CN | 103353892 A | 10/2013 |
| CN | 104317952 A | 1/2015 |
| CN | 104516828 A | 4/2015 |
| CN | 105045928 A | 11/2015 |
| CN | 102880714 B | 8/2016 |

OTHER PUBLICATIONS

First Office Action issued in corresponding EP Application No. 17176694.2 dated Mar. 22, 2019, 7 pages.

Extended European search report issued in corresponding European Application No. 17176694.2, dated Oct. 4, 2017, 9 pages.

* cited by examiner

DATA CLEARING METHOD, APPARATUS AND STORAGE MEDIUM

CROSS-REFERENCE TO RELATED APPLICATION

This application is based on and claims priority of the Chinese Patent Application No. 201610659322.6, filed on Aug. 11, 2016, the entire contents of which are incorporated herein by reference in its entirety for all purposes.

TECHNICAL FIELD

The present disclosure is related to the field of computer processing technology, and more particularly to a data clearing method, apparatus, and storage medium.

BACKGROUND

After a lot of software applications are installed in a terminal, there may be a huge amount of temporary files and file directories. After accumulated over a period of time without being cleared, such temporary files and file directories may cause the operation speed of the terminal to be decreased. In addition, contents seen in the file browser may look disordered, and searching for a file may become difficult.

One clearing method may include the steps of: regularly counting usage frequencies of software applications, and finding a software application whose usage frequency is lower than a predetermined value based on the counting result; determining whether there is a substitutable software application for the software application whose use frequency is lower than the predetermined value; if yes, prompting a user to uninstall the software application whose usage frequency is lower than the predetermined value. However, such method may check usage frequencies of software applications, but does not cope with files and folders.

SUMMARY

Embodiments of the present disclosure provide a data clearing method and apparatus, and a storage medium.

According to a first aspect of the embodiments of the present disclosure, a data clearing method is provided. The method may include: determining whether a difference between a latest access time of the data to be cleared which is stored in a currently scanned node in a data structure, a current time is greater than a predetermined threshold, where the data structure may include a plurality of nodes and each node may store a latest access time and file information of respective data to be cleared; if the difference is greater than the predetermined threshold, determining whether the data to be cleared, which is stored in the currently scanned node in the data structure, is in a white list; if the data to be cleared corresponding to the currently scanned node in the data structure is in the white list, continuing to scan a next node in the data structure; and if the data to be cleared corresponding to the currently scanned node in the data structure is not in the white list, clearing the data to be cleared and corresponding to the currently scanned node.

According to a second aspect of the embodiments of the present disclosure, a data clearing apparatus is provided. The apparatus may include: a processor; and a memory configured to store instructions executable by the processor. The processor may be configured to: determine whether a difference between a latest access time of data to be cleared which is stored in a currently scanned node in a data structure, and a current time is greater than a predetermined threshold, where the data structure may include a plurality of nodes and each node may store a latest access time and file information of respective data to be cleared; if the difference is greater than the predetermined threshold, determine whether the data to be cleared, which is stored in the currently scanned node in the data structure, is in a white list; if the data to be cleared corresponding to the currently scanned node in the data structure is in the white list, continue to scan a next node in the data structure; and if the data to be cleared corresponding to the currently scanned node in the data structure is not in the white list, clear the data to be cleared corresponding to the currently scanned node.

According to a third aspect of the embodiments of the present disclosure, there is provided a non-transitory computer-readable storage medium having stored therein instructions that, when executed by a processor of a mobile terminal, may cause the mobile terminal to perform: determining whether a difference between a latest access time of the data to be cleared which is stored in a currently scanned node in a data structure, a current time is greater than a predetermined threshold, where the data structure may include a plurality of nodes and each node may store a latest access time and file information of respective data to be cleared; if the difference is greater than the predetermined threshold, determining whether the data to be cleared, which is stored in the currently scanned node in the data structure, is in a white list; if the data to be cleared corresponding to the currently scanned node in the data structure is in the white list, continuing to scan a next node in the data structure; and if the data to be cleared corresponding to the currently scanned node in the data structure is not in the white list, clearing the data to be cleared and corresponding to the currently scanned node.

It should be understood that both the foregoing general description and the following detailed description are only exemplary and explanatory and are not restrictive of the disclosure.

BRIEF DESCRIPTION OF THE DRAWINGS

The accompanying drawings, which are incorporated in and constitute a part of this specification, illustrate embodiments consistent with the disclosure and, together with the description, serve to explain the principles of the disclosure.

Figure 1:
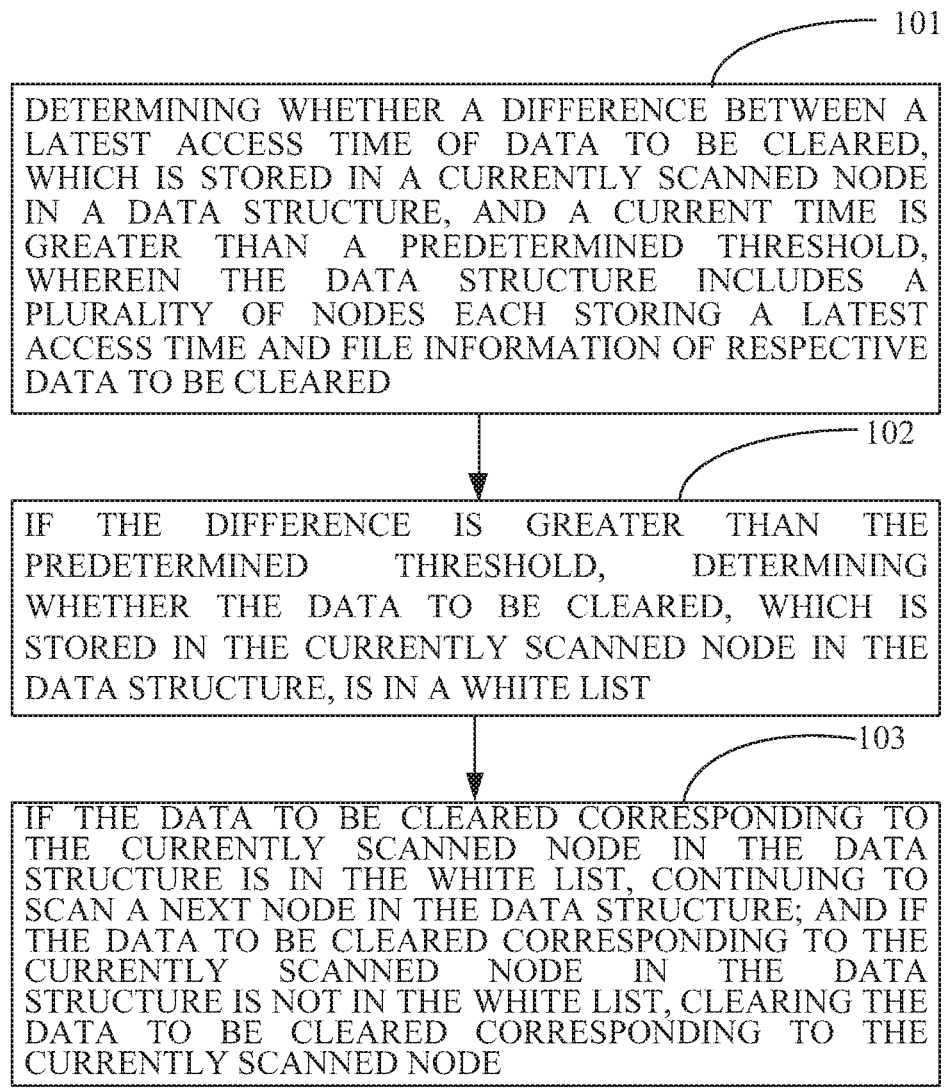
FIG. 1 is a flow chart of a data clearing method according to an embodiment of this disclosure.

Skilled artisans will appreciate that elements in the figures are illustrated for simplicity and clarity and have not necessarily been drawn to scale. For example, the dimensions and/or relative positioning of some of the elements in the figures may be exaggerated relative to other elements to help to improve understanding of various examples of the present disclosure. Also, common but well-understood elements that are useful or necessary in a commercially feasible example are often not depicted in order to facilitate a less obstructed view of these various examples. It will further be appreciated that certain actions and/or steps may be described or depicted in a particular order of occurrence while those skilled in the art will understand that such specificity with respect to sequence is not actually required. It will also be understood that the terms and expressions used herein have the ordinary technical meaning as is accorded to such terms and expressions by persons skilled in the technical field as set forth above, except where different specific meanings have otherwise been set forth herein.

DETAILED DESCRIPTION

Descriptions will now be made in detail to exemplary embodiments, examples of which are illustrated in the accompanying drawings. When accompanying figures are mentioned in the following descriptions, the same numbers in different drawings represent the same or similar elements, unless otherwise indicated. The implementations set forth in the following description of exemplary embodiments do not represent all implementations consistent with the disclosure. Instead, they are merely examples of apparatus and methods consistent with aspects related to the disclosure as recited in the appended claims.

The terminology used in the present disclosure is for the purpose of describing exemplary examples only and is not intended to limit the present disclosure. As used in the present disclosure and the appended claims, the singular forms "a," "an" and "the" are intended to include the plural forms as well, unless the context clearly indicates otherwise. It shall also be understood that the terms "or" and "and/or" used herein are intended to signify and include any or all possible combinations of one or more of the associated listed items, unless the context clearly indicates otherwise.

It shall be understood that, although the terms "first," "second," "third," etc. may be used herein to describe various information, the information should not be limited by these terms. These terms are only used to distinguish one category of information from another. For example, without departing from the scope of the present disclosure, first information may be termed as second information; and similarly, second information may also be termed as first information. As used herein, the term "if" may be understood to mean "when" or "upon" or "in response to" depending on the context.

Reference throughout this specification to "one embodiment," "an embodiment," "exemplary embodiment," or the like in the singular or plural means that one or more particular features, structures, or characteristics described in connection with an example is included in at least one embodiment of the present disclosure. Thus, the appearances of the phrases "in one embodiment" or "in an embodiment," "in an exemplary embodiment," or the like in the singular or plural in various places throughout this specification are not necessarily all referring to the same embodiment. Furthermore, the particular features, structures, or characteristics in one or more embodiments may be combined in any suitable manner.

FIG. 1 is a flow chart of a data clearing method according to an embodiment of this disclosure. As shown in FIG. 1, the method is used in a terminal and may include steps 101-103.

In step 101, it is determined whether a difference between a latest access time of data to be cleared which is stored under a currently scanned node in a data structure, and a current time is greater than a predetermined threshold. The data structure may include a plurality of nodes and each node may store a latest access time and file information of respective data to be cleared.

In step 102, if the difference is greater than the predetermined threshold, it is determined whether the data to be cleared, which is stored in the currently scanned node in the data structure, is in a white list.

In step 103, if the data to be cleared corresponding to the currently scanned node in the data structure is in the white list, scanning is continued for a next node in the data structure; and if the data to be cleared corresponding to the currently scanned node in the data structure is not in the white list, the data to be cleared corresponding to the currently scanned node is cleared.

In the above technical solution of this disclosure, by storing, in each of a plurality of nodes in a data structure, a latest access time and file information of respective data to be cleared and by scanning each node in the data structure, it is determined whether a difference between a latest access time of the data to be cleared which is stored in a currently scanned node in the data structure, and a current time is greater than a predetermined threshold. If the difference is greater than the predetermined threshold, it is determined whether the data to be cleared is in a white list. If the data to be cleared is not in the white list, the data to be cleared is taken as a to-be-cleared object and is cleared. As such, infrequently used data to be cleared (such as software, files and folders) can be cleared, the storage space of the system can be released and the operation speed of the system can be increased.

In one embodiment, the white list may include information of all system files and all system folders. The purpose of creating the white list is to prevent deletion of system folders and key configuration files of software and the consequent system breakdown or instability. The white list may be pre-created by a handset manufacturer or a third party, stored in a cloud, and updated in real time after the system is updated.

In an embodiment, the terminal may acquire the white list from the cloud, and compresses and locally stores the same. To save space, the complete version of the white list is stored in the cloud; and each time the system is started, the white list is acquired from the cloud, compressed and stored locally. Alternatively, the compressed version of the white list may be stored locally, and the white list may be updated from the cloud in real time or regularly.

In an embodiment, the data structure is a linked list including multiple nodes, each node storing a latest access time and related information of respective data to be cleared. The data to be cleared is a file or a folder. The linked list is used to store the latest access times and file information (such as file name or storage directory) of the files and folders.

In an embodiment, a linked list is created. Each node of the linked list stores information of a respective file other than system files or a respective folder other than system folders, according to a chronological sequence of latest access times of the respective files or folders. After the system is started, the linked list may be created according to information of all files except the system files and all folders except the system folders, with each node of the linked list storing the latest access time and file/folder information (such as file/folder name and file/folder storage directory) of a respective file or folder. The nodes in the linked list may be sequenced according to the latest access times of the respective files or folders stored by the nodes (for example, in a chronological order of the latest access times; that is, the earlier an access time is, the nearer to the head of the linked list its corresponding storage position is).

In an embodiment, after the linked list is created, the linked list may be updated in real time according to accesses to the files/folders corresponding to the nodes in the linked list. After a file/folder is updated, a node corresponding to the file/folder may be moved to a corresponding position of the linked list according to the current access time. For example, the node corresponding to the latest accessed file/folder is moved to the end of the linked list, and the latest access time of the file/folder is updated; and after the file/folder is deleted, the node corresponding to the file/folder is deleted from the linked list.

The linked list may or may not be stored permanently. When the linked list is stored permanently, the linked list may be stored in the cloud and/or in the hard drive locally periodically. The linked list itself may also have a timestamp. When the system is shut down and restarted, the linked list stored in the cloud or in the hard drive may be read with the timestamp to the memory, and the linked list may be updated for all files/folders that have been updated after the time provided in the timestamp of the linked list. When the linked list is not stored permanently, the linked list may be generated and may be stored in the memory when the system starts to run.

In an embodiment, nodes in the linked list are scanned, and it is determined whether a difference between the latest access time of the data to be cleared corresponding to a currently scanned node and the current time is greater than a predetermined threshold. To prevent system breakdown or instability, the file/folder cannot be cleared if the data to be cleared corresponding to the currently scanned node is in the white list, because the data to be cleared may be a key file/folder such as a system file/folder. Thus, a next node may be scanned directly instead of processing the file/folder. In an embodiment, the information corresponding to the files/folders in the white list may be deleted from the linked list to accelerate scanning of the linked list.

In an embodiment, nodes in the linked list are scanned, and it is determined whether a difference between the latest access time of the data to be cleared corresponding to a currently scanned node and the current time is greater than a predetermined threshold. If the data to be cleared corresponding to the currently scanned node is not in the white list, the data to be cleared corresponding to the currently scanned node is cleared. If the data to be cleared corresponding to the currently scanned node is not in the white list, it indicates that the data to be cleared can be cleared, and can be taken as a to-be-cleared object and subject to a clearing process.

In an embodiment, a difference between the latest access time of the data to be cleared corresponding to a currently scanned node and the current time may exist and is greater than a predetermined threshold and that the data to be cleared corresponding to the currently scanned node is not in the white list. If the data to be cleared is a file, the file can be taken as a to-be-cleared object and cleared directly. If the data to be cleared is a folder, it is needed to further determine whether the folder is empty. If the folder is not empty, it indicates that there is a file stored in the folder. To prevent mistaken deletion of the file in the folder, the folder is not taken as a to-be-cleared object. If the folder is empty, the folder can be taken as a to-be-cleared object.

However, sometimes, the folder may be taken as a to-be-cleared object even though there are files in the folder. For example, when each file in the folder is also a to-be-cleared object, the folder may still be taken as a to-be-cleared object.

In an embodiment, the predetermined threshold can be set according to actual conditions. For example, a default value may be set by a terminal manufacturer when delivering the terminal from the factory. The predetermined threshold may also be adjusted by a user according to actual conditions during the use of the terminal or set by third-party software according to a current and actual usage condition of the terminal.

In an embodiment, after all the nodes in the linked list are scanned, a list of to-be-cleared objects is provided to the user. Then, an instruction is received from the user, and the to-be-cleared objects are cleared according to the user's instruction. To prevent deletion of files which the user does not desire to delete, information (such as names) of the to-be-cleared objects is provided to the user for selection by the user, before clearing the objects. The user may choose to clear all or part of the to-be-cleared objects.

Sometimes, when part of the to-be-cleared objects is to be cleared, the user may pick or choose to select one or more to-be-cleared objects individually from a list of to-be-cleared objects that is presented to the user. However, when all of to-be-cleared objects are to be cleared or deleted, a single button or an option may be presented to the user and the user may push the button or select the option to clear all to-be-cleared objects. Upon the selection of the single button or the option, a user instruction may be generated to clear all to-be-cleared objects.

Sometimes, a double-check of the linked list may be needed when the to-be-cleared objects are cleared or deleted. For example, because the scan of the nodes in the linked list and obtaining the user instruction to clear the objects may take some time, one or more to-be-cleared objects may be accessed after the node is scanned and during the time to wait for receiving the user instruction. Thus, a double-check of the linked list may be needed before clearing the objects to check and make sure that nodes of to-be-cleared objects have the same positions in the linked list as before the scan took place. In the event that any object of to-be-cleared objects has a higher position in the linked list than before the scan for the node took place, the object may not be cleared or deleted.

According to the above technical solution of the present disclosure, infrequently used cached files can be cleared quickly and regularly, the operation speed of the system can be increased and the storage space of the internal memory card can be increased.

In the following, the solution of the present disclosure will be explained by giving a specific embodiment.

Figure 2:
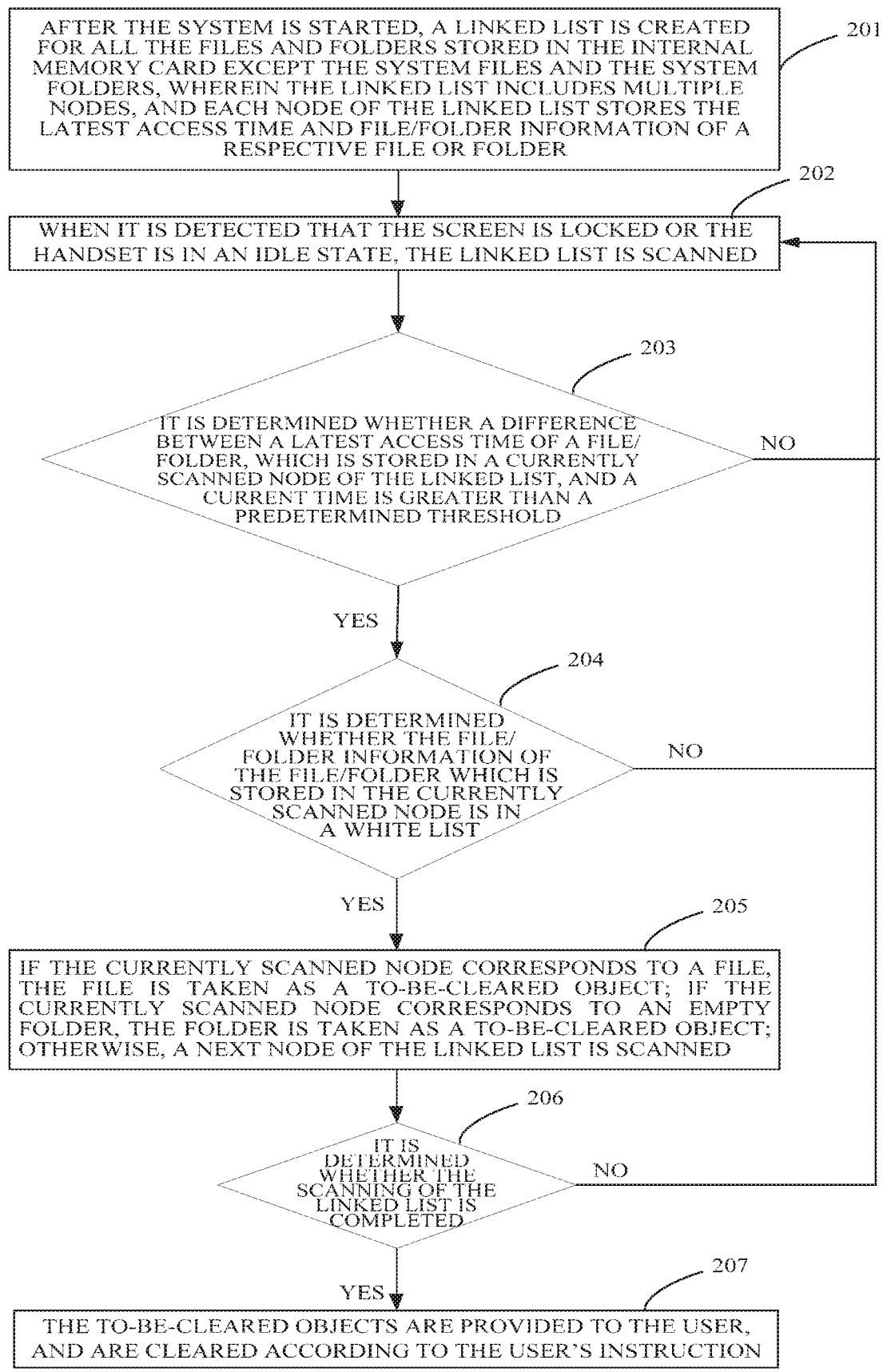
FIG. 2 is a flow chart of a data clearing method according to another embodiment of this disclosure.

In this embodiment, detailed explanation is given by taking an example in which files and folders that are not frequently used in a handset are cleared. As shown in FIG. 2, the specific process may be as below.

In step 201, after the system is started, a linked list is created for all the files and folders stored in the internal memory card except the system files and the system folders. The linked list may include multiple nodes, and each node of the linked list stores the latest access time and file/folder information of a respective file or folder.

In step 202, when it is detected that the screen is locked or the handset is in an idle state, the linked list is scanned.

In step 203, it is determined whether a difference between a latest access time of a file/folder which is stored in a currently scanned node of the linked list, and a current time is greater than a predetermined threshold. If the difference is greater than the predetermined threshold, the method proceeds to step 204; otherwise, it proceeds to step 202 to continue to scan a next node of the linked list.

In step 204, it is determined whether the file/folder information of the file/folder which is stored in the currently scanned node, is in a white list. If the file/folder information of the file/folder stored in the currently scanned node is not in the white list, the method proceeds to step 205; otherwise, it proceeds to step 202 to continue to scan a next node of the linked list.

In step 205, if the currently scanned node corresponds to a file, the file is taken as a to-be-cleared object; if the currently scanned node corresponds to an empty folder, the folder is taken as a to-be-cleared object; and if the currently scanned node corresponds to a folder that is not empty, the method proceeds to step 202 to continue to scan a next node of the linked list.

In step 206, it is determined whether the scanning of the linked list is completed. If the scanning of the linked list is completed, the method proceeds to step 207; otherwise, it proceeds to step 202 to continue to scan a next node of the linked list.

In step 207, to-be-cleared objects are provided to the user, and are cleared according to the user's instruction.

In this embodiment, all files and folders stored in an internal memory card of a handset except system files and system folders are maintained and managed in the form of a linked list, and the linked list is scanned regularly. If the time lapsing from the last access time of a file or folder exceeds a predetermined threshold, that file or folder is cleared. In this solution, a white list is created for the system files and system folders. If the file or folder to be cleared is in the white list, that file or folder should be retained. This disclosure also proposes that, if the data to be cleared is a folder that is not empty, that folder may be retained.

In the following, apparatus embodiments of the present disclosure, which may be configured to perform the method embodiments of the present disclosure, are described.

Figure 3:
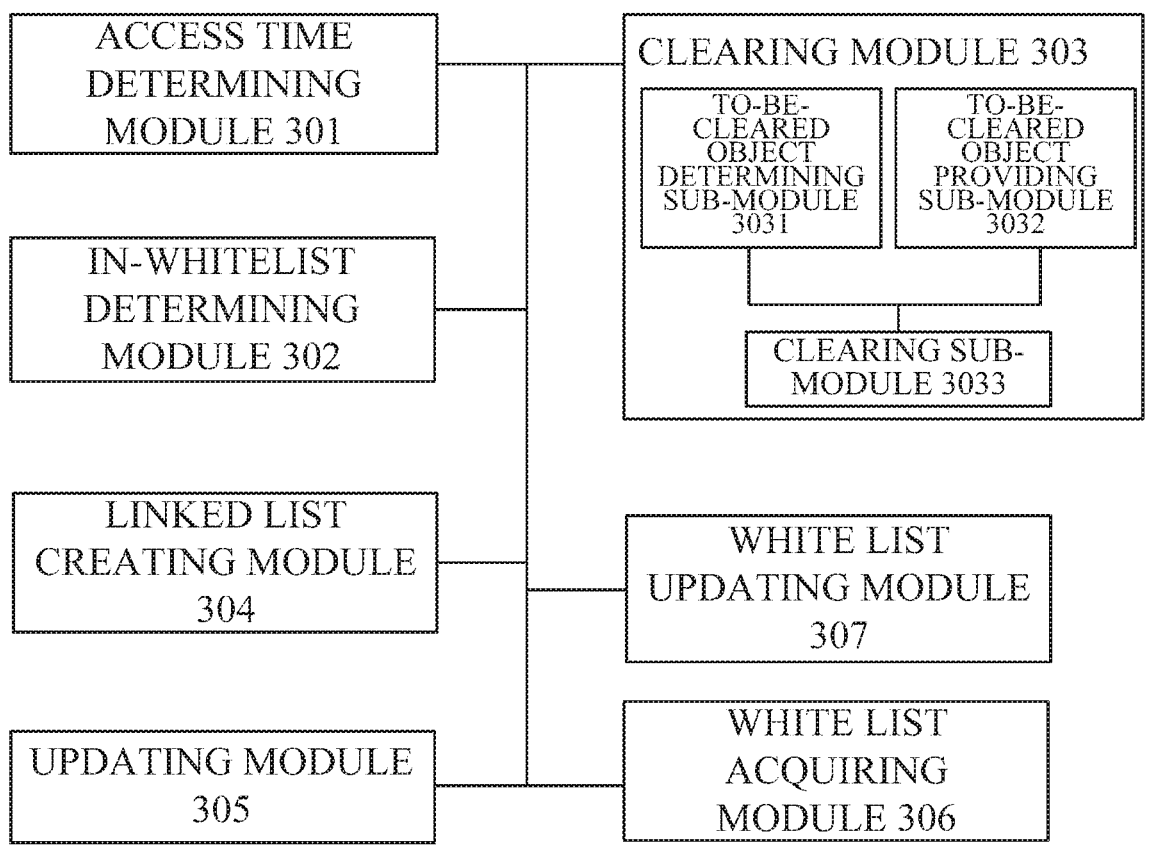
FIG. 3 is a block diagram of a data clearing apparatus according to an embodiment of this disclosure.

FIG. 3 is a block diagram of a data clearing apparatus according to an embodiment of this disclosure. The apparatus may be implemented by software, hardware or a combination of the both as a part or the entirety of an electronic device. As shown in FIG. 3, the data clearing apparatus may include some or all of the modules 301-307.

An access time determining module 301 may be configured to determine whether a difference between a latest access time of data to be cleared which is stored in a currently scanned node in a data structure, and a current time is greater than a predetermined threshold, where the data structure may include a plurality of nodes and each node may store a latest access time and file information of respective data to be cleared.

An in-whitelist determining module 302 may be configured to, if the difference is greater than the predetermined threshold, determine whether the data to be cleared which is stored in the currently scanned node in the data structure is in a white list.

A clearing module 303 may be configured to continue to scan a next node in the data structure, if the data to be cleared corresponding to the currently scanned node in the data structure is in the white list, and to clear the data to be cleared corresponding to the currently scanned node, if the data to be cleared corresponding to the currently scanned node in the data structure is not in the white list. The white list may include information of all system files and all system folders. The data structure is a pre-created linked list, and the data to be cleared is a file or a folder. The file information may include a name or directory of a file or a folder.

A linked list creating module 304 may be configured to create the linked list, where each node of the linked list may store information of a respective file other than system files or a respective folder other than system folders, according to a chronological sequence of latest access times of the respective files or folders.

An updating module 305 may be configured to move a node corresponding to a file or a folder to a corresponding position in the linked list according to a current access time of the file or the folder, if the file or the folder is updated, and to delete the node corresponding to the file or the folder from the linked list, if the file or the folder is deleted.

A white list acquiring module 306 may be configured to acquire the white list from a cloud and to compress and locally store the same.

A white list updating module 307 may be configured to update a compressed version of the locally stored white list regularly or in real time.

The clearing module 303 may include one or more of the following sub-modules 3031-3033.

A to-be-cleared object determining sub-module 3031 may be configured to take a file as a to-be-cleared object if the data to be cleared corresponding to the currently scanned node is a file, and to take a folder as a to-be-cleared object if the data to be cleared corresponding to the currently scanned node is the folder and the folder is empty.

A to-be-cleared object providing sub-module 3032 may be configured to, after all the nodes in the data structure are scanned, provide all to-be-cleared objects to a user.

A clearing sub-module 3033 may be configured to receive an instruction from the user and to clear the to-be-cleared objects according to the instruction from the user.

In the above apparatus, the access time determining module 301 may be configured to determine whether a time lapsing from the last access time of a file or folder stored in a linked list is greater than a predetermined threshold based on the latest access time of the file or folder. The in-whitelist determining module 302 may be configured to, if the time is greater than the predetermined threshold, determine whether the file or folder is in a white list. The to-be-cleared object determining sub-module 3031 of the clearing module 303 may determine the file as a to-be-cleared object. If the data to be cleared is an empty folder, the to-be-cleared object determining sub-module 3031 of the clearing module 303 may also determine the folder as a to-be-cleared object. If the data to be cleared is not an empty folder, the to-be-cleared object determining sub-module 3031 of the clearing module 303 may not determine the folder as a to-be-cleared object.

The to-be-cleared object providing sub-module 3032 of the clearing module 303 may be configured to provide a finally determined list of to-be-cleared objects to a user, for the user to perform selective clearing. The clearing sub-module 3033 of the clearing module 303 may be configured to clear the to-be-cleared objects according to an instruction from the user. The apparatus may further include the linked list creating module 304 and the updating module 305 for creating and updating the linked list respectively. The white list acquiring module 306 of the apparatus may be configured to acquire the white list from a cloud, and compress and locally store the same. The white list updating module 307 of the apparatus may be configured to update the locally stored white list regularly or in real time.

According to a third aspect of the embodiments of the present disclosure, there is provided a data clearing apparatus. The apparatus may include: a processor; and a memory configured to store instructions executable by the processor. The processor may be configured to: determine whether a difference between a latest access time of data to be cleared which is stored in a currently scanned node in a data structure, and a current time is greater than a predetermined threshold, where the data structure may include a plurality of nodes each storing a latest access time and file information of respective data to be cleared; if the difference is greater than the predetermined threshold, determine whether the data to be cleared which is stored in the currently scanned node in the data structure is in a white list; if the data to be cleared corresponding to the currently scanned node in the data structure is in the white list, continue to scan a next node in the data structure; and if the data to be cleared corresponding to the currently scanned node in the data structure is not in the white list, clear the data to be cleared corresponding to the currently scanned node.

The white list may include information of all system files and all system folders. The data structure may be a pre-created linked list, and the data to be cleared may be a file or a folder.

The processor may be further configured to: create the linked list, where each node of the linked list may store information of a respective file other than system files or a respective folder other than system folders, according to a chronological sequence of latest access times of the respective files or folders.

The processor may be further configured to: if a file or a folder is updated, move a node corresponding to the file or the folder to a corresponding position in the linked list according to the current access time of the file or the folder; and if the file or the folder is deleted, delete the node corresponding to the file or the folder from the linked list.

The processor may be further configured to: acquire the white list from a cloud and compress and locally store the same; and update a compressed version of the locally stored white list regularly or in real time.

Clearing the data to be cleared corresponding to the currently scanned node, if the data to be cleared corresponding to the currently scanned node in the data structure is not in the white list, may include: if the data to be cleared corresponding to the currently scanned node is a file, taking the file as a to-be-cleared object; and if the data to be cleared corresponding to the currently scanned node is an empty folder, taking the folder as a to-be-cleared object.

Cleaning the data to be cleared corresponding to the currently scanned node, if the data to be cleared corresponding to the currently scanned node in the data structure is not in the white list, may further include: after scanning all the nodes in the data structure, providing all to-be-cleared objects to a user; and receiving an instruction from the user, and clearing the to-be-cleared objects according to the instruction from the user.

The file information may include a name or directory of a file or a folder.

Regarding the apparatuses in the above embodiments, the specific operations performed by the respective modules have been described in the method embodiments, and will not be elaborated herein.

Figure 4:
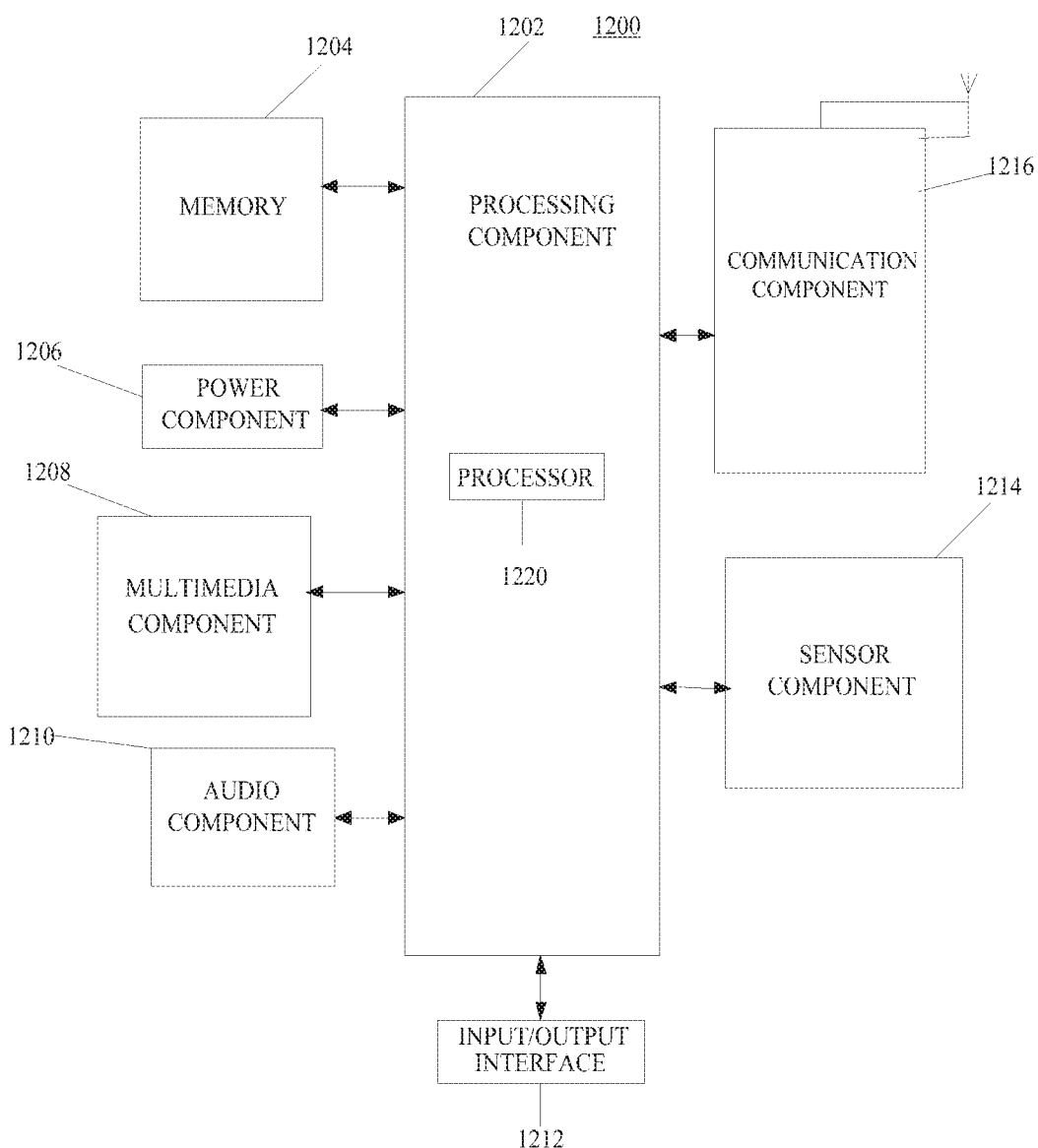
FIG. 4 is a block diagram of a data clearing apparatus according to another embodiment of this disclosure.

FIG. 4 is a block diagram of a data clearing apparatus 1200 according to another embodiment of this disclosure. The apparatus may be applied to a terminal apparatus. For example, the apparatus 1200 may be a mobile phone, a computer, a digital broadcast terminal, a messaging device, a gaming console, a tablet, a medical device, exercise equipment, a personal digital assistant or the like.

The apparatus 1200 may comprise one or more of the following components: a processing component 1202, a memory 1204, a power component 1206, a multimedia component 1208, an audio component 1210, an input/output (I/O) interface 1212, a sensor component 1214, and a communication component 1216.

The processing component 1202 typically controls overall operations of the apparatus 1200, such as the operations associated with display, telephone calls, data communications, camera operations, and recording operations. The processing component 1202 may comprise one or more processors 1220 to execute instructions to perform all or part of the steps in the above described methods. Moreover, the processing component 1202 may comprise one or more modules which facilitate the interaction between the processing component 1202 and other components. For instance, the processing component 1202 may comprise a multimedia module to facilitate the interaction between the multimedia component 1208 and the processing component 1202.

The memory 1204 may be configured to store various types of data to support the operation of the apparatus 1200. Examples of such data comprise instructions for any applications or methods operated on the apparatus 1200, contact data, phonebook data, messages, pictures, video, etc. The memory 1204 may be implemented using any type of volatile or non-volatile memory devices, or a combination thereof, such as a static random access memory (SRAM), an electrically erasable programmable read-only memory (EEPROM), an erasable programmable read-only memory (EPROM), a programmable read-only memory (PROM), a read-only memory (ROM), a magnetic memory, a flash memory, a magnetic or optical disk.

The power component 1206 provides power to various components of the apparatus 1200. The power component 1206 may comprise a power management system, one or more power sources, and any other components associated with the generation, management, and distribution of power in the apparatus 1200.

The multimedia component 1208 comprises a screen providing an output interface between the apparatus 1200 and the user. In some embodiments, the screen may comprise a liquid crystal display (LCD) and a touch panel (TP). If the screen comprises the touch panel, the screen may be implemented as a touch screen to receive input signals from the user. The touch panel comprises one or more touch sensors to sense touches, swipes, and gestures on the touch panel. The touch sensors may not only sense a boundary of a touch or swipe action, but also sense a period of time and a pressure associated with the touch or swipe action. In some embodiments, the multimedia component 1808 comprises a front camera and/or a rear camera. The front camera and the rear camera may receive an external multimedia datum while the apparatus 1200 is in an operation mode, such as a photographing mode or a video mode. Each of the front camera and the rear camera may be a fixed optical lens system or have focus and optical zoom capability.

The audio component 1210 may be configured to output and/or input audio signals. For example, the audio component 1210 may include a microphone ("MIC") configured to receive an external audio signal when the apparatus 1200 is in an operation mode, such as a call mode, a recording mode, and a voice recognition mode. The received audio signal may be further stored in the memory 1204 or transmitted via the communication component 1216. In some embodiments, the audio component 1210 may further include a speaker to output audio signals.

The I/O interface 1212 provides an interface between the processing component 1202 and peripheral interface modules, such as a keyboard, a click wheel, buttons, and the like.

The buttons may comprise, but are not limited to, a home button, a volume button, a starting button, and a locking button.

The sensor component 1214 comprises one or more sensors to provide status assessments of various aspects of the apparatus 1200. For instance, the sensor component 1214 may detect an open/closed status of the apparatus 1200, relative positioning of components, e.g., the display and the keypad, of the apparatus 1200, a change in position of the apparatus 1200 or a component of the apparatus 1200, a presence or absence of user contact with the apparatus 1200, an orientation or an acceleration/deceleration of the apparatus 1200, and a change in temperature of the apparatus 1200. The sensor component 1214 may comprise a proximity sensor configured to detect the presence of nearby objects without any physical contact. The sensor component 1214 may also comprise a light sensor, such as a CMOS or CCD image sensor, for use in imaging applications. In some embodiments, the sensor component 1214 may also comprise an accelerometer sensor, a gyroscope sensor, a magnetic sensor, a pressure sensor, or a temperature sensor.

The communication component 1216 may be configured to facilitate communication, wired or wireless, between the apparatus 1200 and other devices. The apparatus 1200 can access a wireless network based on a communication standard, such as WiFi, 2G or 3G or a combination thereof. In one embodiment, the communication component 1216 receives a broadcast signal or broadcast associated information from an external broadcast management system via a broadcast channel. In one embodiment, the communication component 1216 may further include a near field communication (NFC) module to facilitate short-range communications. For example, the NFC module may be implemented based on a radio frequency identification (RFID) technology, an infrared data association (IrDA) technology, an ultra-wideband (UWB) technology, a Bluetooth (BT) technology, and other technologies.

In some embodiments, the apparatus 1200 may be implemented with one or more application specific integrated circuits (ASICs), digital signal processors (DSPs), digital signal processing devices (DSPDs), programmable logic devices (PLDs), field programmable gate arrays (FPGAs), controllers, micro-controllers, microprocessors, or other electronic components.

In an embodiment, there is also provided a non-transitory computer readable storage medium including instructions, such as comprised in the memory 1204, executable by the processor 1220 in the apparatus 1200, for performing the above-described methods. For example, the non-transitory computer-readable storage medium may be a ROM, a RAM, a CD-ROM, a magnetic tape, a floppy disc, an optical data storage device, and the like.

When executed by the processor 1220 in the apparatus 1200, the instructions in the non-transitory computer-readable storage medium cause the apparatus 100 to perform the above-described data clearing method. The method comprises: determining whether a difference between a latest access time of data to be cleared, which is stored in a currently scanned node in a data structure, and a current time is greater than a predetermined threshold, wherein the data structure may include a plurality of nodes each storing a latest access time and file information of respective data to be cleared; if the difference is greater than the predetermined threshold, determining whether the data to be cleared which is stored in the currently scanned node in the data structure is in a white list; if the data to be cleared corresponding to the currently scanned node in the data structure is in the white list, continuing to scan a next node in the data structure; and if the data to be cleared corresponding to the currently scanned node in the data structure is not in the white list, clearing the data to be cleared corresponding to the currently scanned node.

The white list may include information of all system files and all system folders. The data structure may be a pre-created linked list, and the data to be cleared may be a file or a folder.

The method may further include: creating the linked list, wherein each node of the linked list stores information of a respective file other than system files or a respective folder other than system folders, according to a chronological sequence of latest access times of the respective files or folders.

The method may further include: if a file or a folder is updated, moving a node corresponding to the file or the folder to a corresponding position in the linked list according to the current access time of the file or the folder; and if the file or the folder is deleted, deleting the node corresponding to the file or the folder from the linked list.

The method may further include: acquiring the white list from a cloud, and compressing and locally storing the same; and updating a compressed version of the locally stored white list regularly or in real time.

Clearing the data to be cleared corresponding to the currently scanned node, if the data to be cleared corresponding to the currently scanned node in the data structure is not in the white list, comprises: if the data to be cleared corresponding to the currently scanned node is a file, taking the file as a to-be-cleared object; and if the data to be cleared corresponding to the currently scanned node is an empty folder, taking the folder as a to-be-cleared object.

Clearing the data to be cleared corresponding to the currently scanned node, if the data to be cleared corresponding to the currently scanned node in the data structure is not in the white list, may further include: after scanning all the nodes in the data structure, providing all to-be-cleared objects to a user; and receiving an instruction from the user, and clearing the to-be-cleared objects according to the instruction from the user.

The file information may include a name or directory of a file or a folder.

The present disclosure may include dedicated hardware implementations such as application specific integrated circuits, programmable logic arrays and other hardware devices. The hardware implementations can be constructed to implement one or more of the methods described herein. Applications that may include the apparatus and systems of various examples can broadly include a variety of electronic and computing systems. One or more examples described herein may implement functions using two or more specific interconnected hardware modules or devices with related control and data signals that can be communicated between and through the modules, or as portions of an application-specific integrated circuit. Accordingly, the computing system disclosed may encompass software, firmware, and hardware implementations. The terms "module," "sub-module," "unit," or "sub-unit" may include memory (shared, dedicated, or group) that stores code or instructions that can be executed by one or more processors.

Other embodiments of the disclosure will be apparent to those skilled in the art from consideration of the specification and practice of the disclosure disclosed here. This application is intended to cover any variations, uses, or adaptations of the disclosure following the general principles thereof and including such departures from the present disclosure as come within known or customary practice in the art. It is intended that the specification and examples be considered as exemplary only, with a true scope and spirit of the disclosure being indicated by the following claims.

It will be appreciated that the present disclosure is not limited to the exact construction that has been described above and illustrated in the accompanying drawings, and that various modifications and changes can be made without departing from the scope thereof. It is intended that the scope of the disclosure only be limited by the appended claims.

The invention claimed is:

1. A data clearing method, comprising:
   acquiring a white list from a cloud when a system storing data to be cleared is started, and compressing the white list and locally storing compressed white list;
   updating the white list from the cloud in real time;
   determining whether a difference between a latest access time of the data to be cleared which is stored in a currently scanned node in a data structure, and a current time is greater than a predetermined threshold, wherein the data structure comprises a plurality of nodes and each node stores a latest access time and file information of respective data to be cleared;
   if the difference is greater than the predetermined threshold, determining whether the data to be cleared which is stored in the currently scanned node in the data structure, is in the white list;
   continuing to scan a next node in the data structure, if the data to be cleared corresponding to the currently scanned node in the data structure is in the white list; and
   clearing the data to be cleared corresponding to the currently scanned node, if the data to be cleared corresponding to the currently scanned node in the data structure is not in the white list.

2. The method of claim 1, wherein the white list comprises information of all system files and all system folders.

3. The method of claim 1, wherein the data structure is a pre-created linked list, and the data to be cleared is a file or a folder.

4. The method of claim 3, further comprising: creating the linked list, wherein each node of the linked list stores information of a respective file other than system files or a respective folder other than system folders, according to a chronological sequence of latest access times of the respective files or folders.

5. The method of claim 4, further comprising: if a file or a folder is updated, moving a node corresponding to the file or the folder to a corresponding position in the linked list according to the current access time of the file or the folder;
   if the file or the folder is deleted, deleting the node corresponding to the file or the folder from the linked list.

6. The method of claim 2, further comprising: if a file or a folder is updated, moving a node corresponding to the file or the folder to a corresponding position in the linked list according to the current access time of the file or the folder;
   if the file or the folder is deleted, deleting the node corresponding to the file or the folder from the linked list.

7. The method of claim 1, wherein clearing the data to be cleared corresponding to the currently scanned node, if the data to be cleared corresponding to the currently scanned node in the data structure is not in the white list, comprises:
   if the data to be cleared corresponding to the currently scanned node is a file, taking the file as a to-be-cleared object;
   if the data to be cleared corresponding to the currently scanned node is an empty folder, taking the folder as the to-be-cleared object.

8. The method of claim 7, wherein clearing the data to be cleared corresponding to the currently scanned node, if the data to be cleared corresponding to the currently scanned node in the data structure is not in the white list, further comprises:
   after scanning all the nodes in the data structure, providing all to-be-cleared objects to a user; and
   receiving an instruction from the user, and clearing the to-be-cleared objects according to the instruction from the user.

9. The method of claim 1, wherein the file information comprises a name or a directory of a file or a folder.

10. A data clearing apparatus, comprising:
    a processor; and
    a memory configured to store instructions executable by the processor,
    wherein the processor is configured to:
       acquire a white list from a cloud when a system storing data to be cleared is started, and compressing the white list and locally storing compressed white list;
       updating the white list from the cloud in real time;
       determine whether a difference between a latest access time of the data to be cleared which is stored in a currently scanned node in a data structure, and a current time is greater than a predetermined threshold, wherein the data structure comprises a plurality of nodes and each node stores a latest access time and file information of respective data to be cleared;
       if the difference is greater than the predetermined threshold, determine whether the data to be cleared, which is stored in the currently scanned node in the data structure, is in the white list;
       if the data to be cleared corresponding to the currently scanned node in the data structure is in the white list, continue to scan a next node in the data structure; and
       if the data to be cleared corresponding to the currently scanned node in the data structure is not in the white list, clear the data to be cleared corresponding to the currently scanned node.

11. The data clearing apparatus according to claim 10, wherein the white list comprises information of all system files and all system folders.

12. The data clearing apparatus according to claim 10, wherein the data structure is a pre-created linked list, and the data to be cleared is a file or a folder.

13. The data clearing apparatus according to claim 12, wherein the processor is further configured to: create the linked list, wherein each node of the linked list stores information of a respective file other than system files or a respective folder other than system folders, according to a chronological sequence of latest access times of the respective files or folders.

14. The data clearing apparatus according to claim 10, wherein the processor is further configured to: if a file or a folder is updated, move a node corresponding to the file or the folder to a corresponding position in the linked list according to the current access time of the file or the folder;
   if the file or the folder is deleted, delete the node corresponding to the file or the folder from the linked list.

15. The data clearing apparatus according to claim 10, wherein clearing the data to be cleared corresponding to the currently scanned node, if the data to be cleared corresponding to the currently scanned node in the data structure is not in the white list, comprises:

if the data to be cleared corresponding to the currently scanned node is a file, taking the file as a to-be-cleared object;

if the data to be cleared corresponding to the currently scanned node is an empty folder, taking the folder as the to-be-cleared object.

16. The data clearing apparatus according to claim 15, wherein clearing the data to be cleared corresponding to the currently scanned node, if the data to be cleared corresponding to the currently scanned node in the data structure is not in the white list, further comprises:

after scanning all the nodes in the data structure, providing all to-be-cleared objects to a user; and receiving an instruction from the user, and clearing the to-be-cleared objects according to the instruction from the user.

17. The data clearing apparatus according to claim 10, wherein the file information comprises a name or a directory of a file or a folder.

18. A non-transitory computer-readable storage medium having stored therein instructions that, when executed by a processor of a mobile terminal, cause the mobile terminal to perform:

acquiring a white list from a cloud when a system storing data to be cleared is started, and compressing the white list and locally storing compressed white list;

updating the white list from the cloud in real time;

determining whether a difference between a latest access time of the data to be cleared which is stored in a currently scanned node in a data structure, and a current time is greater than a predetermined threshold, wherein the data structure includes a plurality of nodes and each node stores a latest access time and file information of respective data to be cleared;

if the difference is greater than the predetermined threshold, determining whether the data to be cleared, which is stored in the currently scanned node in the data structure, is in the white list;

continuing to scan a next node in the data structure, if the data to be cleared corresponding to the currently scanned node in the data structure is in the white list; and clearing the data to be cleared corresponding to the currently scanned node, if the data to be cleared corresponding to the currently scanned node in the data structure is not in the white list.

\* \* \* \* \*